United States Patent [19]
Sanchez

[11] 3,869,154
[45] Mar. 4, 1975

[54] BELL-SHAPED PIPE COUPLING HAVING CONNECTIONS FOR HOUSEHOLD SERVICE AND THE LIKE

[76] Inventor: Rodolfo Leuze Sanchez, Calle 8 no. 1-B, Fracc. Ind., Alce Blanco, Naucalpan de Juarez, Estado De Mexico, Mexico

[22] Filed: July 12, 1973

[21] Appl. No.: 378,639

Related U.S. Application Data

[63] Continuation-in-part of Ser. No. 175,088, Aug. 26, 1971, abandoned.

[30] Foreign Application Priority Data
Oct. 28, 1970 Mexico .............................. 123041

[52] U.S. Cl.................... 285/156, 285/3, 285/231, 285/397
[51] Int. Cl............................................. F16l 41/00
[58] Field of Search ....... 285/156, 150, 5, 231, 383, 285/397, 3

[56] References Cited
UNITED STATES PATENTS
| | | | |
|---|---|---|---|
| 427,478 | 5/1890 | McEvoy | 285/3 |
| 865,497 | 9/1907 | Kenyon | 285/383 X |
| 901,545 | 10/1908 | Morrison | 285/150 |
| 2,757,024 | 7/1956 | Lowe et al. | 285/156 |

FOREIGN PATENTS OR APPLICATIONS
| | | | |
|---|---|---|---|
| 257,191 | 2/1928 | Italy | 285/231 |
| 107,630 | 1/1899 | Germany | |

*Primary Examiner*—H. Hampton Hunter

[57] ABSTRACT

A pipe coupling adapted for the eventual connection of household service piping to a main or supply piping to which the coupling is connected, in which the coupling includes at least one radially projecting connector boss having a blind-bottomed aperture formed therein. The pipe coupling is constructed generally of a cylindrical tubular-shaped body having a peripherical ring-shaped enlargement in one of its ends so as to be substantially bell-shaped, forming at its enlarged end a housing or internal annular groove in which a suitable elastomeric material seal ring is inserted; one or more longitudinally extending ring-shaped radially inwardly projecting protuberances forming an abutment within the internal cylindrical surface of the pipe coupling so as to limit the extent of insertion of one or more pipes which are to be slidingly received within the coupling, to beyond a region where one or a plurality of angularly spaced external cylindrically shaped connector bosses are located.

3 Claims, 5 Drawing Figures

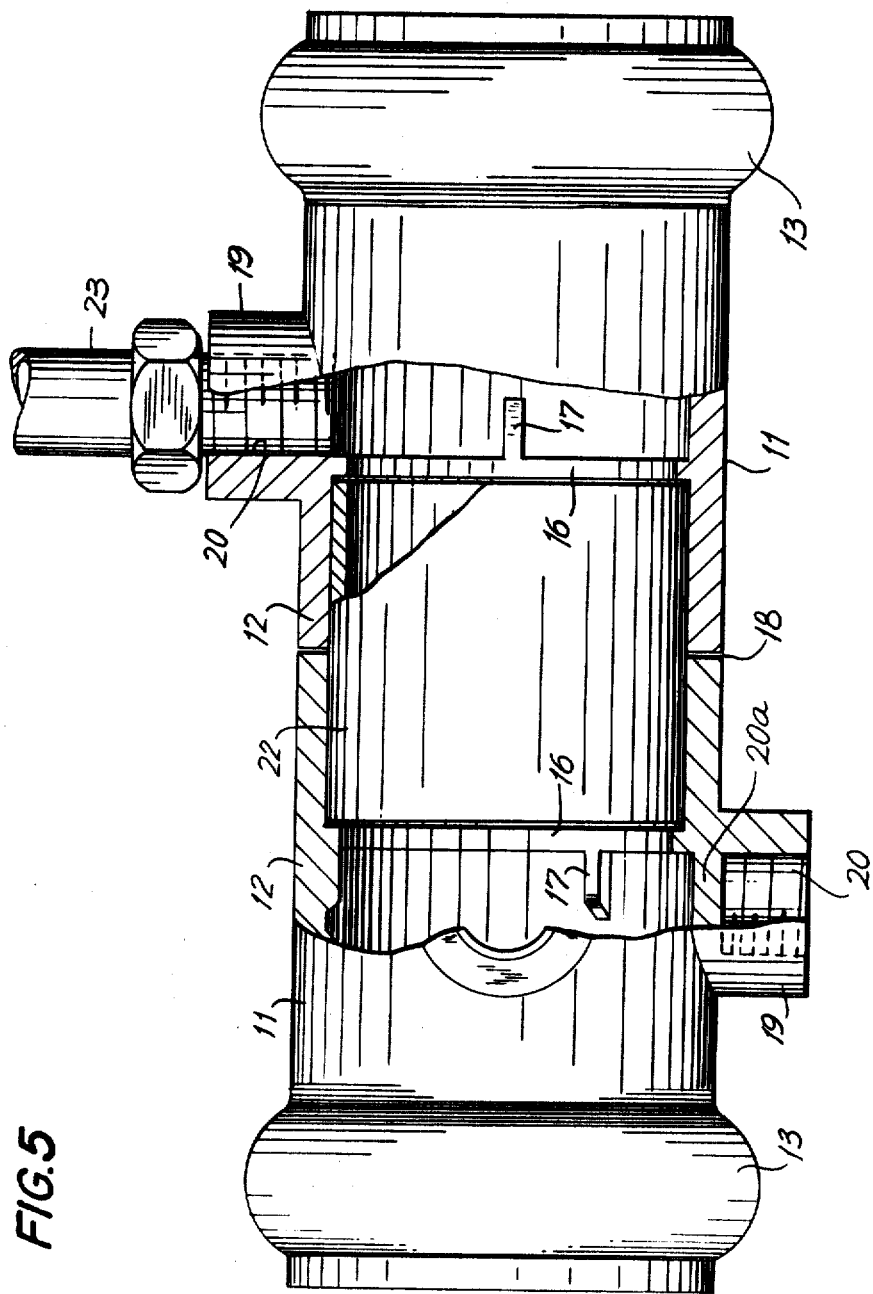

BELL-SHAPED PIPE COUPLING HAVING CONNECTIONS FOR HOUSEHOLD SERVICE AND THE LIKE

BACKGROUND OF THE INVENTION

This application is a continuation-in-part application of Ser. No. 175,088; filed Aug. 26, 1971 now abandoned.

The present invention relates to pipe couplings and, more particularly, to pipe couplings incorporating at least one "blind" hole connector adapted for eventual connection to household service piping and the like.

Frequently, it becomes desirable, or even necessary, to attach suitable household service piping and the like to a main or supply piping in a simple and readily effected manner. Preferably, such connection is to be carried out in situ; without in any instance disturbing or interrupting to any appreciable extent the flow through the supply piping.

However, since such required household service connection at the time of installation of the main or supply piping may only be in the contemplative stage or distant future, it may not be necessary or even desirable to initially install such connections into the main piping since these may require suitable plugs and form sites for possible leakage from the main piping.

DISCUSSION OF THE PRIOR ART

Heretofore, pipe connections for household service or the like, have been constructed of clamps or similar members requiring a multiplicity of operative manipulations and accessories or elements for their installation, all of which results in more complex installations, as well as an increase in the time required for assembling the various pipe connection elements.

Moreover, since piping accessories and elements and other piping materials used generally oxidize or rust, these fracture easily, may become misadjusted or simply displaced, so as to produce operational failures during manipulation and use of the piping installation.

Various prior art publications illustrate piping arrangements adapted for the eventual connection of household service piping and the like.

Thus, Markle U.S. Pat No. 1,933,117 shows piping in which connector bosses have integrally formed frangible members which seal the connector bosses. However, these frangible members are merely thin-walled members and are easily ruptured so that in actuality the threaded interior of the connector boss does not form a blind hole in which the bottom thereof is substantially in alignment with the outer circumferential wall of the pipe coupling so as to provide an uninterrupted continuous pipe until the blind hole is drilled or breached for household service connection.

Similarly McEvoy U.S. Pat. No. 427,478 illustrates a connector having an integral external cover plate which, however, does not form the blind hole construction for in futuro household service connection.

Italian Pat. No. 257,191 discloses a pipe coupling having interior protuberances for limiting the insertion of an adjoining pipe end so as not to block the aperture for a household service or the like piping connection. However, there is no utilization of a blind hole connector structure for the eventual in situ connection of household service piping.

BRIEF SUMMARY OF THE INVENTION

It is, accordingly, a primary object of the present invention to provide a pipe coupling having integral means for the future connection of at least one household service piping.

Another object of the present invention is to provide a pipe coupling adapted for the eventual connection of household service piping to a main or supply piping to which the coupling is connected, in which the coupling includes at least one radially projecting connector boss having a blind-bottomed aperture formed therein.

The pipe coupling according to the present invention, adapted to provide future connections for household service, is constructed generally of a cylindrical tubular-shaped body having a peripherical ring-shaped enlargement in one of its ends so as to be substantially bell-shaped, forming at its enlarged end a housing or internal annular groove in which a suitable elastomeric material seal ring is inserted; one or more longitudinally extending ring-shaped radially inwardly projecting protuberances forming an abutment within the internal cylindrical surface of the pipe coupling so as to limit the extent of insertion of one or more pipes which are to be slidingly received within the coupling, to beyond a region where one or a plurality of angularly spaced external cylindrically shaped connector bosses are located. The connector bosses which may be mounted on or integrally formed with the pipe coupling have an internally threaded bore extending only partially therethrough so as to form a "blind" hole toward the coupling, being sealed off for approximately the thickness thereof. As desired, the blind hole may be bored or drilled through so as to furnish a connection for household service and the like. The coupling may be coupled to another identical coupling by means of an internal sleeve to which said two pipe couplings are fastened or screwed so as to form a double-ended pipe coupling arrangement having one or more potential connections for household service.

BRIEF DESCRIPTION OF THE DRAWINGS

These and other objects of the present invention may be more readily understood and ascertained through the following detailed description of preferred embodiments of the invention, taken in conjunction with the accompanying drawings, in which:

FIG. 5 is a longitudinal view, partly in section, illustrating two pipe couplings of the present invention coupled together so as to form a double ended coupling with one of the couplings being connected to household service piping.

DETAILED DESCRIPTION OF THE INVENTION

Figure 1:
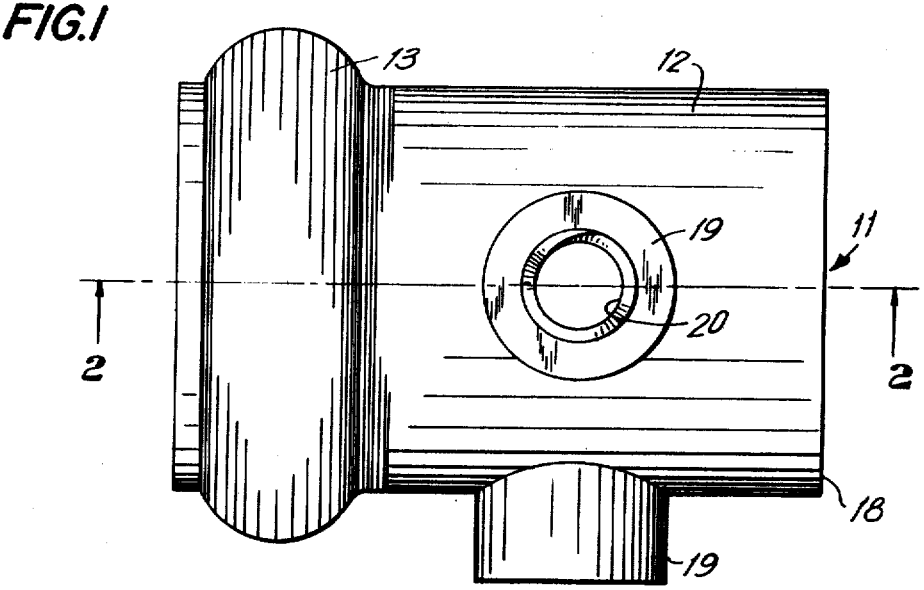
FIG. 1 is a side view of a pipe coupling adapted to provide connections for household service, according to the present invention.

Referring now to FIGS. 1 to 4, a pipe coupling 11 having provision for future connection to household service includes a generally cylindrical tubular body portion 12, having proximate one of its ends an external bell-like ring-shaped enlargement 13 which generally conforms with an internal annular recess 14. An elastomeric material seal ring 15 is located with the recess. The pipe coupling 11 has extending radially inwardly from its internal annular surface a ring-shaped flange or protuberance 16 and a plurality of peripherally spaced longitudinal ribs 17 serving as abutments which prevent that a supply or main pipe (not shown) which is to be connected with the pipe coupling 11 at its end 18, from extending inwardly beyond a predetermined distance. Past that point or distance, the coupling 11 includes one or a plurality of annularly spaced external connector bosses 19 of generally cylindrical shape, fastened to or integrally formed with the pipe coupling and projecting radially outwardly thereof. The connector bosses 19 may be provided with either a smooth finish or threaded internal bore 20 extending only part-way thereinto so as to form a "blind" hole with the bottom thereof defining a thickness 20a corresponding generally to the wall thickness of coupling body portion 12.

The "blind" hole 20, when it is desired to connect the supply or main pipe to household service piping, may be drilled so as to form an aperture extending through thickness 20a at the bottom of the bore hole 20 and communicating hole 20 with the interior of pipe coupling 11. When it is required to connect another household service line, a further connector boss 19 may be drilled through.

Figure 2:
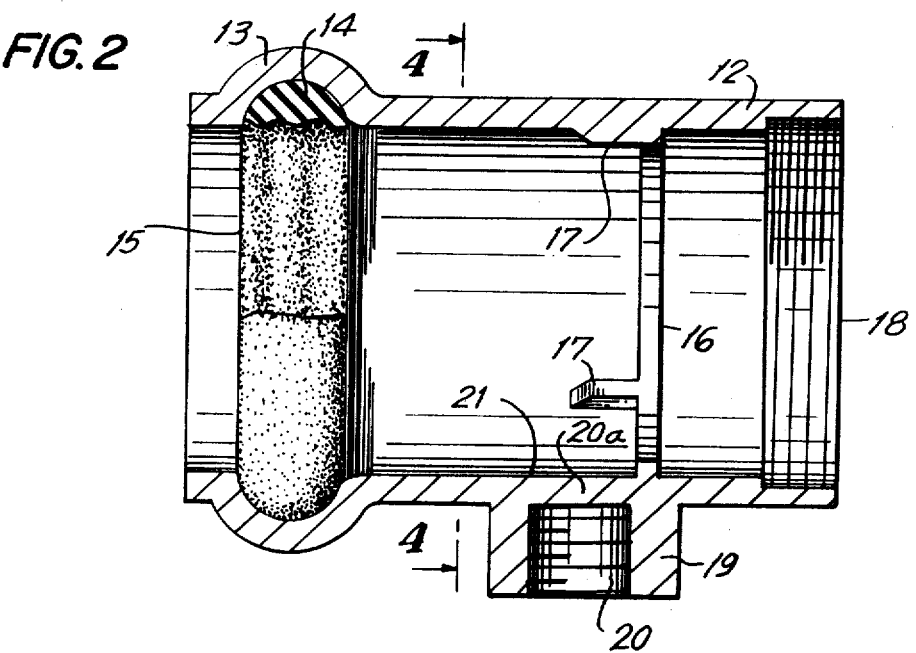
FIG. 2 is a longitudinal sectional view of the pipe coupling taken along line 2—2 in FIG. 1.
Figure 3:
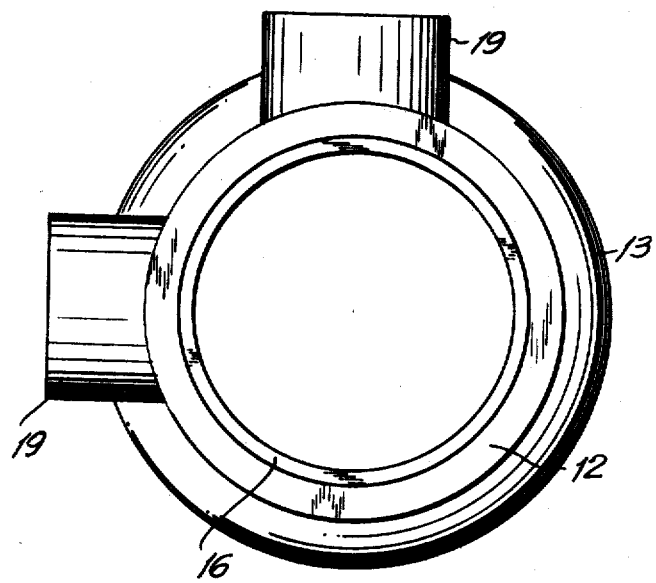
FIG. 3 is an end view of the pipe coupling of FIG. 1.
Figure 4:
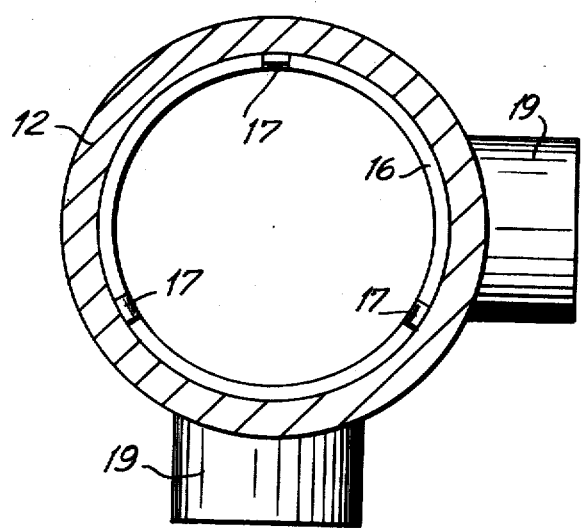
FIG. 4 is a sectional view taken along line 4—4 in FIG. 2.

The end 18 of the pipe coupling 11 may be threaded as shown in FIG. 2, or may be coupled through a suitable attachment to a pipe end, or through a tubular-shaped sleeve 22 having connected at the opposite thereof another similar pipe coupling 11, so as to form a double-ended pipe coupling assembly, illustrated in FIG. 5 so as to allow for multiple connections for household service and the like.

As shown in FIG. 5, one of the pipe couplings 11 has its connector boss 19 drilled through (right-end coupling) so as to accommodate the complementary threaded end of a suitable household service piping 23.

While there has been shown what is considered to be the preferred embodiment of the invention, it will be obvious that modifications may be made which come within the scope of the disclosure of the specification.

What is claimed is:

1. A pipe coupling adapted to form connections for household service piping and the like, comprising a tubular body having an external annular enlargement in a first one of its ends in axial alignment with an internal annular hollow recess, an elastomeric material sealing ring being positioned in said recess and adapted to sealingly engage the periphery of a pipe inserted in said end of the tubular body, an annular radially inwardly projecting protuberance and a plurality of annularly spaced longitudinal ribs extending therefrom being formed in said coupling, at least one cylindrical connector boss integrally formed with and radially extending from said coupling, said annular protuberance being positioned to one side of said boss and said ribs extending axially into the plane of said connector boss so as to provide space for piping inserted into said coupling and to prevent said piping from blocking said boss, said connector boss being angularly offset relative to said longitudinal ribs, and a radially inwardly extending blind hole formed in said connector boss, said blind hole extending inwardly so as to form an inner wall coextensive with and of generally the same thickness as the wall thickness of said tubular body and adapted to be drilled through so as to form a flow connection between the interior of said pipe coupling and a household service piping said blind hole in said connector boss comprising an internal thread extending between the outside of said boss and the bottom of said blind hole adapted to be engaged by a complementary threaded household service piping.

2. A pipe coupling as claimed in claim 1, said tubular body having a plurality of said radially extending connector bosses in axially coplanar, peripherally spaced relationship, each of said connector bosses being positioned intermediate respectively two adjacent of said longitudinal ribs.

3. A pipe coupling as claimed in claim 1, said tubular body having a threaded portion formed at the second end thereof, said threaded end portion being adapted to engage a complementary threaded end of a piping.

* * * * *